United States Patent [19]

Hideyama et al.

[11] Patent Number: 4,511,617

[45] Date of Patent: Apr. 16, 1985

[54] MAGNETIC RECORDING MEDIUM

[75] Inventors: Shozo Hideyama, Yokohama; Akio Ishizawa, Tokyo; Katuya Kumagai; Minoru Hashimoto, both of Yokohama, all of Japan

[73] Assignee: Tokyo Shibaura Denki Kabushiki Kaisha, Kawasaki, Japan

[21] Appl. No.: 497,280

[22] Filed: May 23, 1983

[30] Foreign Application Priority Data

May 25, 1982 [JP] Japan .................................. 57-87348

[51] Int. Cl.³ ............................ G11B 5/70; B32B 7/02
[52] U.S. Cl. ..................................... 428/212; 360/134; 360/135; 360/136; 427/128; 427/131; 428/328; 428/329; 428/408; 428/694; 428/900
[58] Field of Search ................ 427/131, 128; 428/695, 428/328, 212, 229, 694, 408, 900; 360/134–136

[56] References Cited

U.S. PATENT DOCUMENTS

| | | | |
|---|---|---|---|
| 3,023,166 | 2/1962 | Duinker | 428/402 |
| 3,185,775 | 5/1965 | Camras | 360/134 |
| 3,423,233 | 1/1969 | Akashi et al. | 428/695 |
| 3,761,311 | 9/1973 | Perrington | 428/332 |
| 4,246,316 | 1/1981 | Aonuma | 428/336 |
| 4,275,113 | 6/1981 | Saito et al. | 427/131 |
| 4,439,796 | 3/1984 | Kitamoto | 428/900 |
| 4,442,159 | 4/1984 | Dezawa | 427/128 |

FOREIGN PATENT DOCUMENTS

| | | |
|---|---|---|
| 50-14206 | 8/1975 | Japan . |
| 54-19712 | 2/1979 | Japan . |
| 56-110205 | 9/1981 | Japan .............................. 252/62.54 |

*Primary Examiner*—Ellis P. Robinson
*Attorney, Agent, or Firm*—Schwartz, Jeffery, Schwaab, Mack, Blumenthal & Koch

[57] ABSTRACT

Disclosed is a magnetic recording medium which comprises; a substrate; a first magnetic layer applied on the surface of the substrate and having an easy axis of magnetization in the in-plane direction of the substrate; and a second magnetic layer applied on the surface of the first magnetic layer, formed of ferrite series powder represented by the formula;

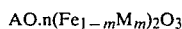

$$AO \cdot n(Fe_{1-m}M_m)_2O_3$$

(wherein A is at least one metallic element selected from the group consisting of Ba, Sr, Pb and Ca; M is at least one substituent component selected from the group consisting of Co, Ti, Ni, Mn, Cu, Zn, In, Ge and Nb; m is 0.08 to 0.2; and n is 5.4 to 6.0), and having an easy axis of magnetization in a direction perpendicular to the plane of the substrate; said first magnetic layer having a surface resistivity of $1 \times 10^2$ to $1 \times 10^8$ Ω. In another embodiment, a conductive layer having a surface resistivity of $1 \times 10^7$ Ω or smaller may be interposed between the substrate and the first magnetic layer.

13 Claims, No Drawings

MAGNETIC RECORDING MEDIUM

BACKGROUND OF THE INVENTION

This invention relates to magnetic recording media having excellent magnetic recording characteristics over a wide frequency bandwith, and more specifically to magnetic recording media improved in their running performance and durability.

Reflecting the recent volume increase of information and the recent great improvements in frequency characteristics and the like of recording and reproducing systems, magnetic recording media are also desired strongly to have expanded recording bands.

It has been the well known that conventional magnetic recording media have inherent limitations with respect to their characteristics in the short wavelength range, because such conventional magnetic recording media make use of their lengthwise remanent magnetization and their intra-medium self-demagnetizing fields tend to increase and their magnetization vectors are caused to turn so as to minimize their intra-medium energy as recording wavelengths become shorter, resulting in the occurrence of abrupt output drops.

The most general technique for minimizing the influence of such a self-demagnetizing field as much as possible is to increase the coercive force of each medium so that it can overcome the self-demagnetizing field. However, this manner of solution induces a reduction in the penetration of magnetization in the thicknesswise direction of the medium, thereby causing long wavelength outputs to drop or requiring erasing and recording heads which have very high magnetic flux densities and, correspondingly, leading to increases in the prices of heads in addition to the cost of media.

In order to solve such problems as mentioned above, it has been proposed by the present inventors to use a magnetic recording medium having a double-layered structure obtained by successively forming, on a nonmagnetic substrate, a first magnetic layer having an easy axis of magnetization in the in-plane direction of the substrate and a second magnetic layer having an easy axis of magnetization in a direction perpendicular to the plane of the substrate in which the second magnetic layer contains, as its principal component, a hexagonal magnetic powder material such as barium ferrite magnetic powder, as disclosed in Japanese Patent Application No. 1545/1982, filed Jan. 8, 1982, and published July 16, 1983, as Japanese published patent application No. 119610/1983.

A magnetic recording medium having such a double-layered structure is produced by successively forming, on the surface of a substrate made for example of polyethylene terephthalate resin, a first magnetic coating layer and second magnetic coating layer by applying their corresponding magnetic coating formulations which are each prepared by dispersing desired magnetic powder together with a dispersant in a resinous binder.

However, the running performance of the above magnetic recording medium was not always satisfactorily smooth, though good in recording characteristics, when it was formed into tapes or discs and allowed to run in actual equipment. Its durability was also insufficient, presumably because of its poor running performance.

Such poor running performance seems to be attributed to two causes; one of which is frictional resistance, which occurs between the second magnetic layer of a tape or disc made of the magnetic recording medium and various parts and members of the actual equipment when the former is allowed to run in contact with the latter, and the other of which is electrification phenomenon which occurs, as a result of the above-mentioned frictional contact, in the second magnetic layer which is an insulator. Especially, the latter (electrification phenomenon) seems to serve as a dominant cause.

It has been attempted to enhance the lubricity of the second magnetic layer by incorporating a trace amount of a lubricant (for example, silicone oil, fatty acid ester, or the like) in the above-described magnetic coating formulation for the second magnetic layer with a view toward improving the running performance by removing the former cause (frictional resistance).

However, the above attempt still allowed the latter cause (electrification phenomenon) to remain because components of the second magnetic layer were insulators respectively. Thus, the tape was caused to stick on cylinders and other parts of an actual equipment because of the electrification phenomenon which occurred when the tape was running or the back face of its substrate and its second magnetic layer were subjected to the "sticking" phenomenon when fast-forwarded or rewound, whereby developing the so-called wound-up wrinkles or pleats when the tape was even a little slack.

It is routinely practiced, as a first countermeasure against the above problems, to incorporate a conductive material such as carbon black additionally in the second magnetic layer so as to impart a suitable degree of conductivity thereto, whereby to reduce the frictional electrification. This countermeasure is certainly effective to remove the electrification phenomenon to a satisfactory extent and thus to improve the running performance. However, it lowers reproduction outputs in the high band (short wavelength) range which is considered to be most critical, resulting in an increased output loss. Moreover, the magnetic powder (e.g., generally, barium ferrite) of the second magnetic layer has higher insulating capacity, compared with the magnetic powder (for example, $\gamma$-ferrite, Co-substituted $\gamma$-ferrite or chromium oxide) of the second magnetic layer. Thus, it is necessary to incorporate a conductive material in such a large amount that overcomes the insulation of the magnetic powder, thereby further aggravating the above-described inconvenient deterioration in characteristics.

A second countermeasure is to form a conductive layer having a suitable degree of conductivity over the back face of a substrate. This eliminates the above-mentioned "sticking" phenomenon between the back face of the substrate and the second magnetic layer. Although it is easy to apply two or more coating layers, one over another, on one side of a substrate in one step by making a small improvement to the production facilities, twice as many steps are required to form coating layers over respective sides of a substrate. If one wants to carry out the application of coating layers over respective sides of a substrate in one step, a huge investment would be indispensable on production facilities. In either case, the production cost of the thus-obtained product will be high. Thus, the above production processes are extremely disadvantageous from the economical standpoint.

SUMMARY OF THE INVENTION

It is an object of this invention to provide a magnetic recording medium capable of exhibiting improved running performance and permitting magnetic recoding over a wide frequency band.

The present inventors have carried out an investigation on possible relationship between the surface resistivity and running performance of each of various magnetic recording media. As a result, it was found that the running performance starts to deteriorate because of frictional electrification when the surface resistivity of the second magnetic layer exceeds $1 \times 10^{10} \Omega$ but the "sticking" phenomenon becomes more remarkable when the surface resistivity becomes smaller than $1 \times 10^3 \Omega$.

With the foregoing finding in view, the present inventors have carried out an intensive research in order to limit the surface resistivity of the second magnetic layer within the range of $1 \times 10^3$ to $1 \times 10^{10} \Omega$. As a result, they have revealed that the surface resistance of the second magnetic layer varies while governed by the surface resistance of the first magnetic layer, leading to development of magnetic recording media according to this invention.

DETAILED DESCRIPTION OF PREFERRED EMBODIMENTS

According to this invention, there is provided a magnetic recording medium comprising a substrate; a first magnetic layer applied on the surface of the substrate and having an easy axis of magnetization in the in-plane direction of the substrate; and a second magnetic layer applied on the surface of the first magnetic layer, formed of ferrite series magnetic powder represented by the following formula:

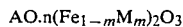

$$AO \cdot n(Fe_{1-m}M_m)_2O_3$$

(wherein A is at least one metallic element selected from the group consisting of Ba, Sr, Pb and Ca; M is at least one substituent component selected from the group consisting of Co, Ti, Ni, Mn, Cu, Zn, In, Ge and Nb; m is 0.08 to 0.2; and n is 5.4 to 6.0), and having an easy axis of magnetization in a direction perpendicular to the plane of the substrate; said first magnetic layer having a surface resistivity of $1 \times 10^2$ to $1 \times 10^8 \Omega$.

In another embodiment of the invention, neither the first nor the second magnetic layer contains any conductive material and a conductive layer having a surface resistivity of $1 \times 10^7 \Omega$ or smaller is interposed between the substrate and the first magnetic layer. In still another embodiment of the invention, however, the first magnetic layer and/or the second magnetic layer may optionally contain a small amount of conductive material, if the surface resistivity of the first magnetic layer at the side with which the second magnetic layer is in contact is thereby still controlled in the range of $1 \times 10^2$ to $10^8 \Omega$.

A coating formulation for the first magnetic layer according to this invention may be prepared by dispersing magnetic particles, which have easy axes of magnetization in the in-plane direction of a substrate, together with a dispersant in a resinous binder. As magnetic particles useful in the practice of this invention, γ-ferrite powder, cobalt-substituted γ-ferrite powder, chromium oxide powder and the like may be mentioned. Particles having an average particle size of about 0.2 to 0.5 μm and an iHc of about 3000–800 Oe are usually employed.

Among these magnetic powders, γ-ferrite powder may be suitably used in the present invention.

The surface resistivity of the first magnetic layer of this invention is limited within the range of $1 \times 10^2$ to $1 \times 10^8 \Omega$. If the surface resistivity is higher than $1 \times 10^8 \Omega$, frictional electrification starts to occur in the second magnetic layer during the running of the magnetic tape and the running of the magnetic tape is thus hampered. On the other hand, if the surface resistivity is lowered to a value smaller than $1 \times 10^2 \Omega$, the "sticking" phenomenon is induced between the second magnetic layer and the back face of the substrate.

In order to control the surface resistivity of the first magnetic layer within the range of $1 \times 10^2$ to $1 \times 10^8 \Omega$, it is necessary for the first magnetic layer to contain a predetermined amount of a conductive material because, when magnetic powder, resinous binder, dispersant, etc. are formed into a coating layer, it will become a non-condutive material.

As the conductive mateiral useful in the practice of this invention, any material may be employed so long as it is fine and conductive powder and can be dispersed uniformly in a resinous binder. Among various conductive materials, it is desirous to use carbon black in view of production cost and productivity. Especially, high-conductive Ketchen Black EC (trade name; product of Lion Corp.) and Vulcan VXC-72 (trade name; product of Cabbot Corp.) are favorable.

The amount of the conductive material to be incorporated in the first magnetic layer is determined naturally by the extent of surface resistivity needed. In the case of carbon black for example, the surface resistivity of the first magnetic layer can be controlled within the range of $1 \times 10^2$ to $1 \times 10^8 \Omega$ when the conductive material is incorporated at a weight proportion of 2 to 50%, and preferably 5 to 35% based on the resinous binder. Any contents less than 2 wt.% result in surface resistivities higher than $1 \times 10^8 \Omega$, while any contents in excess of 50 wt.% lead to surface resistivities smaller than $1 \times 10^2 \Omega$.

The magnetic powder used in the second magnetic layer according to this invention is represented by the following chemical formula:

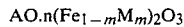

$$AO \cdot n(Fe_{1-m}M_m)_2O_3$$

(wherein A is at least one metallic element selected from the group consisting of Ba, Sr, Pb and Ca; M is at least one substituent component selected from the group consisting of Co, Ti, Ni, Mn, Cu, Zn, In, Ge and Nb; m is 0.08 to 0.2; and n is 5.4 to 6.0), and has an easy axis of magnetization in the in-plane direction of its substrate. In the present invention, magnetic powder of the above formula in which A is Ba, namely, barium ferrite series powder is suitable. Among these magnetic powders, those having an average particle size in the range of about 0.08 to 0.1 μm and an iHc of about 600 to 1200 Oe are normally used with preference.

Other components employed for the formation of the first and second magnetic layers, namely, the binder, dispersant and the like may be those conventionally used.

In another embodiment of the magnetic recording medium according to this invention, neither the first nor the second magnetic layer contains any conductive material and a conductive layer having a predetermined surface resistance may be interposed between the first magnetic layer and the substrate. In such an embodiment, however, the first magnetic layer and/or the second magnetic layer may optionally contain a small amount of conductive material if the surface resistivity of the first magnetic layer is still controlled in the range of $1\times10^2$ to $1\times10^8\Omega$, as mentioned in the foregoing. This conductive layer is effective because it can prevent the reproduction output from dropping at the lower band when no conductive material is contained at all, or only a small amount of conductive material is contained, in the first conductive layer.

Such a conductive layer may be readily formed by applying a thin film of a conductive metal such as Cu, Ni, Al, Co, Cr or the like onto one side of a substrate in accordance with the evaporation or sputtering technique, plating such a metal onto one side of a substrate, or coating a conductive coating formulation, which has been prepared by dispersing 30 to 70 wt.% of fine particles of such a metal or carbon black in a resinous binder, onto one side of a substrate.

As exemplary resins and dispersants usable in such a coating formulation, may be mentioned, as resinous binders, resins soluble in organic solvents such as polymers or copolymers of vinyl chloride, vinyl acetate, vinylidene chloride, acrylonitrile, acrylic acid, acrylic esters, methacrylic acid, methacrylic esters, styrene, vinyl fluoride, vinylidene fluoride, butadiene and vinyl butyral as well as urethane elastomer, phenoxy resin, nitrocellulose, cellulose acetate, polyester resins, unsaturated polyester resins, epoxy resins, urea resin, melamine resin, alkyd resin and urea-formaldehyde resin; and water-soluble resins such as polyvinyl alcohol, carboxymethylcellulose, sodium or ammonium acrylate and methacrylate and water-emulsified resins such as hydroxyethyl acrylate and methacrylate; and, as dispersants, fatty acids such as stearic acid, oleic acid, myristic acid, lauric acid, capric acid, palmitic acid, elaidic acid, linoleic acid and stearolic acid, their alkali metal salts and alkaline earth metal salts, phosphoric esters and lecithin. The magnetic recording medium is obtained by successively forming the first and second magnetic layers over the conductive layer.

Here, it is necessary that the surface conductivity of the conductive layer is not higher than $1\times10^7\Omega$. If this surface conductivity should exceed $1\times10^7\Omega$, the surface conductivity of the first magnetic layer is rendered higher than $1\times10^8\Omega$ and that of the second magnetic layer is correspondingly rendered higher than $1\times10^{10}\Omega$.

EXAMPLE 1

(1) Preparation of Coating Formulation for First Magnetic Layer:

Charged in a sand mill, were 100 parts by weight of Co-substituted γ-ferrite powder having the average particle size of 0.3 μm and the iHc of 6300 Oe as magnetic powder, 1.5 parts by weight of lecithin as a dispersant, 6.25 parts by weight (equivalent to 25 wt.% based on a resinous binder) of carbon black (Ketchen Black EC; product of Lion Corp.) as a conductive material and 25 parts by weight of a 1:1 mixture by weight of a vinyl chloride-vinyl acetate copolymer (VAGH: product of Union Carbide Corporation) and urethane elastomer (N-2304; product of Nippon Polyurethane Co., Ltd.). The contents of the sand mill were subjected to a dispersing processing, followed by an addition of 10 parts by weight of a hardening agent (Colonate L: product of Nippon Polyurethane Co., Ltd.) prior to coating the thus-dispersed coating formulation.

(2) Preparation of Coating Formulation for Second Magentic Layer:

Charged in a sand mill were 80 parts by weight of BaO 5.8(Fe$_{1-0.1}$Co$_{0.1}$Ti$_{0.1}$)$_2$O$_3$ powder having the average particle size of 0.08 μm and the iHc of 850 Oe as magnetic powder, 1.6 parts by weight of lecithin as a dispersant, 15 parts by weight of the vinyl chloride/vinyl acetate copolymer (VAGH: product of Union Carbide Corporation) and 10 parts by weight of urethane elastomer N-2301 (product of Nippon Polyurethane Co., Ltd.) both as resinous binders, 0.16 part by weight of chromium oxide powder having the average particle size of about 1 μm as an abrasive, 0.8 parts by weight of silicone oil as a lubricating oil and 200 parts by weight of a 2:1:0.75:1 mixture by volume of methyl ethyl ketone, methyl isobuty ketone, cyclohexanone and toluene as a solvent. The contents of the sand mill were subjected to a thorough dispersing processing, followed by an addition of 10 parts by weight of the hardening agent similar to the above coating formulation for the first magnetic layer.

(3) Fabrication of Magnetic Recording Medium:

The coating formulation for the first magnetic layer was first applied over one side of a substrate made of polyethylene terephthalate to form a coating layer of about 3 μm thick. The thus-coated substrate was calender-processed, followed by its hardening treatment at 50° C. and for 48 hours.

Thereafter, the coating formulation for the second magnetic layer was applied over the thus-formed first magnetic layer to form a coating layer of about 2.0 μm thick. The resultant coated substrate was processed and treated under conditions similar to those employed for the first magnetic layer, thereby fabricating a magnetic recording medium.

EXAMPLES 2 TO 5

Magnetic recording media were fabricated following the procedure of Example 1 except that carbon black was compounded respectively in amounts of 3, 15, 35 and 50, all by wt.% (Examples 2 to 5, respectively), based on the resinous binder in the coating formulation for the first magnetic layer.

Also fabricated were other magnetic recording media containing respectively 1 wt.% and 55 wt.% of carbon black. They will be designated as Comparative Example 1 and Comparative Example 2 respectively.

EXAMPLES 6 TO 8

Cu and Ni were respectively caused to evaporate and deposit on one side of substrates of the same type as used in Example 1 in accordance with the usual vacuum evaporation technique, thereby forming two types of conductive layers (as Examples 6 and 7 respectively). Additionally (as Example 8), a conductive coating formulation, which had been formed by dispersing 65 parts by weight of a resinous binder (urethane elastomer, N-2304), 15 parts by weight of a dispersant (oleic acid), 30 parts by weight of carbon black (Ketchen Black EC) and 20 parts by weight of a 1:1 mixture of methyl ethyl ketone and methyl isobutyl ketone in a sand mill and then adding 5.2 parts by weight of the hardening agent (Colonate L), was applied in the thickness of 0.5 μm on one side of a substrate of the same type as used in Example 1. The thus-coated substrate was subjected to a calendering processing and then to a hardening treatment at 50° C. and for 48 hours, thereby forming a conductive layer of a further type.

Over the conductive layer of each of the above three substrates, a first magnetic layer was formed following the same procedure as that used in Example 1 and using a magnetic coating formulation similar to the coating formulation for the first magnetic layer of Example 1 but free of carbon black. Over the thus-formed first magnetic layer, a second magentic layer was also formed using the coating formulation for the second magnetic layer which formulation was used in Example 2. Thus, three types of magnetic recording media bearing different conductive layers were fabricated. These will be disignated as Examples 6 to 8, respectively.

Besides, a magnetic recording medium carrying the above-described first and second magnetic layers on one side of a substrate was also fabricated. This magnetic recording medium will be designated as Comparative Example 3.

On each of the above-fabricated 11 types of magnetic recording media, the surface resistivities of its first and secondmagnetic layers were measured. Furthermore, its S/N ratio was also measured at 4 MHz. In addition, the running performance of each of the recording media was also observed.

Measurement and observation results are all summarized in the following Table 1, in which each S/N ratio is a relative value calculated supposing that the S/N ratio of the magnetic recording medium of Example 1 is 0 (zero).

TABLE 1

|  | Surface resistivity ($\Omega$) | | S/N ratio (4MHz:dB) | Running performance |
|---|---|---|---|---|
|  | First magnetic layer | Second magnetic layer | | |
| Example 1 | $10^4$ | $10^6$ | 0 | Good |
| Example 2 | $10^6$ | $10^{8-9}$ | +1 | " |
| Example 3 | $10^5$ | $10^7$ | 0 | " |
| Example 4 | $10^3$ | $10^5$ | +1 | " |
| Example 5 | $10^2$ | $10^4$ | +1 | " |
| Example 6 | (Cu)$10^5$ | $10^7$ | +1 | " |
| Example 7 | (Ni)$10^5$ | $10^7$ | +1 | " |
| Example 8 | (C)$10^6$ | $10^8$ | +1 | " |
| Comparative Example 1 | $10^{10}$ | $10^{12-13}$ | −1 | Poor |
| Comparative Example 2 | $10^1$ | $10^3$ | −2 | " |
| Comparative Example 3 | $10^{11}$ | $10^{13}$ | −3 | " |

The magnetic recording medium according to this invention has the merits that (1) its reproduction output is high over a wide frequency band and the drop in reproduction output, especially at the higher band, is suppressed because the magnetic powders used in the first and second magnetic layers are each equipped with the above-described magnetic characteristics; and (2) the "sticking phenomenon" and frictional electrification are avoided and excellent running performance is assured since the surface resistivity of the second magnetic layer lies within a suitable range. Therefore, the magnetic recording medium according to this invention has a great industrial value.

I claim:

1. A magnetic recording medium which comprises;
a substrate;
a first magnetic layer applied on the surface of the substrate and having an easy axis of magnetization in the in-plane direction of the substrate;
and a second magnetic layer applied on the surface of the first magnetic layer, formed of ferrite series powder represented by the formula:

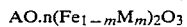

$$AO \cdot n(Fe_{1-m}M_m)_2O_3$$

(wherein A is at least one metallic element selected from the group consisting of Ba, Sr, Pb and Ca; M is at least one substituent component selected from the group consisting of Co, Ti, Ni, Mn, Cu, Zn, In, Ge and Nb; m is 0.08 to 0.2; and n is 5.4 to 6.0), and having an easy axis of magnetization in a direction perpendicular to the plane of the substrate;
said first magnetic layer having a surface resistivity of $1 \times 10^2$ to $1 \times 10^8 \Omega$.

2. The magnetic recording medium according to claim 1, wherein said first magnetic layer contains 2 to 50 wt.% of carbon black based on a resinous binder.

3. The magnetic recording medium according to claim 1, wherein the magnetic powder making up the first magnetic layer is selected from the group consisting of $\gamma$-ferrite powder, cobalt-substituted $\gamma$-ferrite powder and chromium oxide powder.

4. The magnetic recording medium according to claim 3, wherein the magnetic powder making up the first magnetic layer is $\gamma$-ferrite powder.

5. The magnetic recording medium according to claim 1, wherein the element represented by A of the second magnetic layer is Ba.

6. The magnetic recording medium according to claim 5, wherein the second magnetic layer is formed of BaO 5.8(Fe$_{1-0.1}$Co$_{0.1}$Ti$_{0.1}$)$_2$O$_3$ powder.

7. The magnetic recording medium according to claim 1, wherein a conductive layer having a surface resistivity of $1 \times 10^7 \Omega$ or smaller is interposed between the substrate and the first magnetic layer.

8. The magnetic recording medium according to claim 7, wherein said first magnetic layer contains 2 to 50 wt.% of carbon black based on a resinous binder.

9. The magnetic recording medium according to claim 7, wherein magnetic powder making up the first magnetic layer is selected from the group consisting of $\gamma$-ferrite powder, cobalt-substituted $\gamma$-ferrite powder and chromium oxide powder.

10. The magnetic recording medium according to claim 9, wherein magnetic powder making up the first magnetic layer is $\gamma$-ferrite powder.

11. The magnetic recording medium according to claim 6, wherein the element represented by A of the second magnetic layer is Ba.

12. The magnetic recording medium according to claim 11, wherein the second magnetic layer is formed of BaO 5.8(Fe$_{1-0.1}$Co$_{0.1}$Ti$_{0.1}$)$_2$O$_3$ powder.

13. The magnetic recording medium according to claim 7, wherein neither the first magnetic layer nor the second magnetic layer contains any conductive material and the conductive layer having a surface resistivity of $1 \times 10^7 \Omega$ or smaller is interposed between the substrate and the first magnetic layer.

* * * * *